United States Patent [19]

Arai et al.

[11] Patent Number: 4,520,175

[45] Date of Patent: May 28, 1985

[54] METHOD OF MAKING HEAT-RESISTANT POLYESTER BY REACTING WITH A N,N,DIGLYCIDYL-ACIDAMIDE

[75] Inventors: Yoshihiro Arai, Joyo; Takumi Tanaka, Uji, both of Japan

[73] Assignee: Unitika Ltd., Osaka, Japan

[21] Appl. No.: 591,642

[22] Filed: Mar. 20, 1984

[30] Foreign Application Priority Data

Apr. 14, 1983 [JP] Japan .................. 58-66439

[51] Int. Cl.³ .............................. C08G 63/76
[52] U.S. Cl. .................. 525/438; 528/288; 528/297
[58] Field of Search .............. 528/288, 297; 525/438

[56] References Cited

U.S. PATENT DOCUMENTS

| 4,139,521 | 2/1979 | Lazarus et al. | 528/297 X |
| 4,459,390 | 7/1984 | Arai et al. | 525/438 |
| 4,459,391 | 7/1984 | Arai et al. | 525/438 |
| 4,459,392 | 7/1984 | Arai et al. | 525/438 |

*Primary Examiner*—Lucille M. Phynes
*Attorney, Agent, or Firm*—Richard A. Anderson

[57] ABSTRACT

This invention is a method of making heat-resistant polyester, the method being characterized by reacting the polyester consisting of the aromatic dicarboxylic acid and the glycol with 2-6 carbons with 0.1-5 wt % of the bifunctional epoxy compound expressed by the general formula

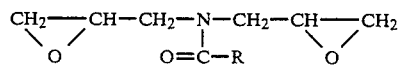

(R is hydrocarbon group; it may be substituted) to reduce the amount of end carboxyl group to less than 15 g equivalents per $10^6$ g of the polymer.

2 Claims, No Drawings

METHOD OF MAKING HEAT-RESISTANT POLYESTER BY REACTING WITH A N,N,DIGLYCIDYL-ACIDAMIDE

BACKGROUND OF THE INVENTION

This invention is related to the method of making heat-resistant polyester which has reduced amount of end carboxyl group (hereinafter this will be written as COOH).

Various methods have been proposed on the reduction of COOH of polyester. The typical example is known to be the method of reacting the polyester with epoxy compound. The present inventors examined this method and found that addition of the epoxy compound reduced the COOH but also caused a reduction in the degree of polymerization and that the epoxy compound has poor reactivity with the COOH of polyester, giving insufficient effect.

SUMMARY OF THE INVENTION

The present inventors have carried out studies to solve this problem and discovered that it is effective to react with the bifunctional epoxy compound expressed by the following general formula (1):

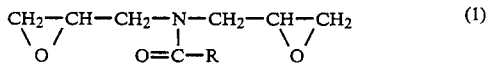
$$\text{CH}_2\text{—CH—CH}_2\text{—N—CH}_2\text{—CH—CH}_2 \quad (1)$$
with O=C—R, and epoxide rings on both ends (wherein R is a hydrocarbon group which may be substituted) and thus have achieved this invention.

Thus, the key point of this invention is the method of making heat-resistant polyester, the method being characterized by reacting the polyester consisting of aromatic dicarboxylic acid and the glycol component having 2–6 carbons with 0.1–5 weight % of the bifunctional epoxy compound expressed by the above-mentioned general formula (1) to reduce the COOH to less than 15 gram equivalents per $10^6$ grams of the polymer.

In this invention, the polyester refers to the condensation polymer of an aromatic dicarboxylic acid and a glycol of 2–6 carbons and its type is not restricted in any way. One can use any homopolymer or copolymers. As for the method of polycondensation of the polyester, one can use the known methods without modification. The following are specific examples of the bifunctional epoxy compounds expressed by the above-mentioned general formula (1) in this invention:

N,N-diglycidyl-acetoamide,
N,N-diglycidyl-propionamide,
N,N-diglycidyl-butylamide,
N,N-diglycidyl-valeric acid amide,
N,N-diglycidyl-capronamide,
N,N-diglycidyl-heptylamide,
N,N-diglycidyl-caprylamide,
N,N-diglycidyl-nonylamide,
N,N-diglycidyl-caprineamide,
N,N-diglycidyl-crotonamide,
N,N-diglycidyl-vinylacetoamide,
N,N-diglycidyl-allylacetoamide,
N,N-diglycidyl-cyclohexylamide,
N,N-diglycidyl-benzamide,
N,N-diglycidyl-naphthylamide
and their substituted compounds.

These compounds can be synthesized by starting from the compound in which there is the —NH$_2$ group in place of the N,N-diglycidyl group and substituting the hydrogen atom on the nitrogen atom with the glycidyl group.

In other words, the glycidyl group is introduced directly by reacting epihydrin, particularly epichlorohydrin or epibromohydrin, to the —NH$_2$ group in the starting substance. This reaction can be carried out preferably in the presence of a small amount of a quaternary ammonium compound such as tetraethylammonium bromide as the catalyst.

Such bifunctional epoxy compounds can be used alone or in combination of two or more.

The amount of addition of the compound given by the above general formula (1) which is used in this invention is 0.1–5 weight % with respect to the polyester. When this amount is too small, the degree of blocking the COOH is low. If it is too much, the reaction proceeds sufficiently but the gelation of the polyester causes an abnormal rise of the pressure inside the extruder, making the spinning impossible.

The reaction between the polyester and the compound expressed by the above-mentioned general formula (1) is carried out by adding the compound of formula (1) after the polyester reaches the intrinsic viscosity of 0.50 and requiring more than 3 minutes at the temperature which is above the melting point of the polyester. Here, the intrinsic viscosity refers to the value measured at 20° C. using the mixed solvent of phenol/ethanetetrachloride (1/1 weight ratio). At the time of reaction, it is naturally necessary that the reaction system is filled with inert gas such as nitrogen or that the system is not exposed to a reactive gas such as oxygen which accelerates the decomposition of the polyester. Also, the reaction should be carried out under stirring. The compound of above formula (1) may be added and mixed before the completion of the polycondensation of polyester; but one can also adopt the methods in which it is added and mixed into the polyester in the molten state after the completion of polymerization prior to the melt spinning or it is mixed with the solid polyester in granular or powder form and then reacted while melt spinning. The reaction proceeds without a catalyst but one can use a preferable catalyst.

By the addition of the compound of above formula (1), COOH of polyester decreases effectively. Also, as the compound of the above formula (1) is bifunctional, addition of this compound causes little reduction in the degree of polymerization of the polymer. Rather, connection of the polyester molecular chains results in the desirable results of increased degree of polymerization.

Thus, improvement of the heat resistance is achieved by reacting the polyester with 0.1–5 wt. % of above general formula (1) to reduce the COOH to less than 15 g equivalents per $10^6$ g of the polymer. In obtaining the polyester of this invention, it is naturally possible to add other additives to the polyester for other purposes.

The final form of the polyester in this invention may be any of the fibers, films and other molded products. The fibers are useful as tire cord.

The polyester with reduced COOH as obtained by the method of this invention has much improved thermal stability, i.e., the resistance to the hydrolysis or aminolysis at high temperature; this makes it possible to upgrade the performance in the conventional applications, rationalize the process and apply the polyester to new fields where application was not possible in the past. Thus, the practical value is improved drastically.

In the following, the invention is explained in detail by use of the examples of invention.

EXAMPLES OF THE INVENTION AND COMPARATIVE EXAMPLES

Epoxy compound was blended by the amount shown in Table 1 to the polyethylene terephthalate obtained by the known common method from terephthalic acid and ethylene glycol and having an intrinsic viscosity of 0.73 and COOH of 24 g equivalents per $10^6$ g of the polymer. This was spun through a spinnerette die having 192 holes of diameter 0.5 mm. The spinning conditions were: temperature, 300° C.; residence time 3-12 minutes; throughput, 300 g/min; take-up speed, 317 m/min; the yarn obtained had 8520 d/192 f. The updrawn yarn obtained was drawn to 3.8 times in the first stage at 90° C. and to 1.5 times in the second stage at 200° C. Next, the yarn was heat-treated at 220° C. under tension. Finally, the drawn yarn of 1500 d/192 f was obtained. With the drawn yarn obtained, first the 40 twist/10 cm Z twist was given. Next, 2 strands were taken together and a 40 twist/10 cm S twist was applied to obtain the 1500 d×2 griege cord. This griege cord was dipped in the one bath type adhesive solution (Pexul, product of ICI Company, —RLF liquid); then a tension of 1.0 kg per cord was applied and heat treatment was given at 240° C. for 3 minutes to prepare the treated cord. Next, to examine the heat resistance of the treated cord, heat-resistance strength was measured with the sample which was prepared under the vulcanization conditions of 170° C., 100 kg/cm², 60 minutes. Next, the adhesion strength of the treated cord was evaluated by the H test. First, the test piece was prepared by the vulcanizing adhesion at 150° C., 100 kg/cm², 30 minutes, and the adhesive force was measured. The property values of the drawn yarn and treated cord are shown in Table 1.

The epoxy compounds of the Examples of the Invention, 1-4, were synthesized by reacting benzamide, acetoamide, n-butylamide, cyclohexylamide, and epichlorohydrin using a small amount of tetraethylammonium bromide as the catalyst.

In Comparative Example 5, Denacol EX-221 is the trade name (Nagase Sangyosha) of dibromo-neopentyl-glycoldiglycidylether.

From the examples of the invention, 1-4, shown in Table 1, which satisfy the requirements of this invention, it is seen that, by adding the epoxy compounds, COOH decreased, intrinsic viscosity increased, heat-resistant strength and heat resistant strength retention improved and adhesive strength also improved.

When the amount of addition of epoxy compound was too little (Comparative Example 2), the effect was not sufficient; when it was too much (Comparative Example 3), polyester gelled and the pressure inside the extruder rose abnormally making the spinning impossible.

Comparative Examples 4 and 5 indicate the known examples. Comparative Example 4 is the case of using monofunctional epoxy compound and Comparative Example 5 is the case of using bifunctional epoxy compound. In each case, addition of epoxy compound caused the reduction in the intrinsic viscosity, In Comparative Example 5, reactivity was poor between the epoxy compound and the COOH of polyester and the effect of reducing COOH was not observed.

We claim:

1. The method of making heat-resistant polyester comprising reacting the polyester with from about 0.1 to about 5 percent by weight of the polyester, of the bifunctional epoxy compound,

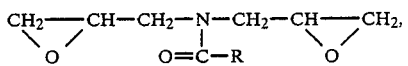

wherein R is a hydrocarbon or substituted hydrocarbon, to reduce the end carboxyl groups of the polyester to less than 15 g equivalents per $10^6$ g of polyester polymer, wherein said polyester consists of an aromatic dicarboxylic acid reacted with a glycol having 2 to 6 carbon atoms.

2. The method of claim 1 wherein the bifunctional epoxy compound is selected from the group consisting of
N,N-diglycidyl-acetoamide,
N,N-diglycidyl-propionamide,
N,N-diglycidyl-butylamide,
N,N-diglycidyl-valeric acid amide,

TABLE 1

| | Epoxy Compounds | | Drawn Yarn | | Treating Cord | | | |
|---|---|---|---|---|---|---|---|---|
| | Name of Compound | Amt. Added, Wt. % | I.V. | COOH g eq/10⁶ g | Strength, kg | Heat Resistant Strength, kg | Strength Retention % | Adhesive Strength kg |
| Example of Invention 1 | N,N—diglycidyl-benzamide | 0.5 | 0.90 | 6 | 22.9 | 18.8 | 82 | 20.2 |
| Comparative Example 1 | — | — | 0.70 | 29 | 18.4 | 11.0 | 60 | 15.2 |
| Example of Invention 2 | N,N—diglycidyl-acetoamide | 0.5 | 0.88 | 8 | 22.0 | 17.6 | 80 | 19.5 |
| Example of Invention 3 | N,N—diglycidyl-n-butylamide | 0.5 | 0.88 | 9 | 21.8 | 17.8 | 82 | 19.6 |
| Example of Invention 4 | N,N—diglycidyl-cyclohexylamide | 0.5 | 0.86 | 10 | 21.5 | 17.2 | 80 | 19.0 |
| Comparative Example 2 | N,N—diglycidyl-benzamide | 0.05 | 0.72 | 19 | 18.6 | 12.6 | 68 | 15.8 |
| Comparative Example 3 | Same as above | 6.0 | Spinning Impossible | | — | — | — | — |
| Comparative Example 4 | N—glycidyl-phthalimide | 0.5 | 0.68 | 6 | 17.5 | 12.2 | 70 | 15.4 |
| Comparative Example 5 | Denacol EX-221 | 0.5 | 0.67 | 26 | 17.1 | 10.5 | 61 | 14.2 |

I.V. = Intrinsic Viscosity

N,N-diglycidyl-capronamide,
N,N-diglycidyl-heptylamide,
N,N-diglycidyl-caprylamide,
N,N-diglycidyl-nonylamide,
N,N-diglycidyl-caprineamide,
N,N-diglycidyl-crotonamide,
N,N-diglycidyl-vinylacetoamide,
N,N-diglycidyl-allylacetoamide,
N,N-diglycidyl-cyclohexylamide,
N,N-diglycidyl-benzamide,
N,N-diglycidyl-naphthylamide, and their substituted compounds.

* * * * *